United States Patent
Wieber et al.

(10) Patent No.: US 9,017,630 B2
(45) Date of Patent: Apr. 28, 2015

(54) METHOD FOR PRODUCING HYDRIDOSILANES

(75) Inventors: Stephan Wieber, Karlsruhe (DE); Matthias Patz, Bottrop (DE); Martin Trocha, Essen (DE); Hartwig Rauleder, Rheinfelden (DE); Ekkehard Mueh, Rheinfelden (DE); Harald Stueger, Graz (AT); Christoph Walkner, Graz (AT)

(73) Assignee: Evonik Degussa GmbH, Essen (DE)

( * ) Notice: Subject to any disclaimer, the term of this patent is extended or adjusted under 35 U.S.C. 154(b) by 517 days.

(21) Appl. No.: 13/504,331

(22) PCT Filed: Nov. 8, 2010

(86) PCT No.: PCT/EP2010/067016
§ 371 (c)(1),
(2), (4) Date: Apr. 26, 2012

(87) PCT Pub. No.: WO2011/061088
PCT Pub. Date: May 26, 2011

(65) Prior Publication Data
US 2012/0214005 A1    Aug. 23, 2012

(30) Foreign Application Priority Data
Nov. 18, 2009 (DE) .......................... 10 2009 053 804

(51) Int. Cl.
*C01B 33/04* (2006.01)
*C01B 33/107* (2006.01)

(52) U.S. Cl.
CPC .............. *C01B 33/04* (2013.01); *C01B 33/043* (2013.01); *C01B 33/10773* (2013.01)

(58) Field of Classification Search
USPC ................................................ 423/347, 344
See application file for complete search history.

(56) References Cited

U.S. PATENT DOCUMENTS

| 4,395,389 A | 7/1983 | Seth |
| 5,641,849 A | 6/1997 | Nishida et al. |
| 8,002,954 B2 | 8/2011 | Popp et al. |
| 8,038,961 B2 | 10/2011 | Sonnenschein et al. |
| 8,105,564 B2 | 1/2012 | Sonnenschein et al. |
| 8,221,593 B2 | 7/2012 | Lang et al. |
| 8,246,925 B2 | 8/2012 | Schwarz et al. |
| 2010/0080746 A1 | 4/2010 | Lang et al. |
| 2010/0176338 A1 | 7/2010 | Cannady et al. |
| 2010/0266489 A1 | 10/2010 | Rauleder et al. |
| 2010/0270296 A1 | 10/2010 | Rauleder et al. |
| 2010/0278706 A1 | 11/2010 | Mueh et al. |
| 2010/0296994 A1 | 11/2010 | Rauleder et al. |
| 2011/0052474 A1 | 3/2011 | Mueh et al. |
| 2011/0150739 A1 | 6/2011 | Seliger et al. |
| 2011/0189072 A1 | 8/2011 | Brausch et al. |

(Continued)

FOREIGN PATENT DOCUMENTS

| EP | 0 673 960 | 9/1995 |
| WO | 2008 051328 | 5/2008 |
| WO | 2011 104147 | 9/2011 |

OTHER PUBLICATIONS

U.S. Appl. No. 13/989,823, filed May 28, 2013, Wieber, et al.

(Continued)

*Primary Examiner* — Edward Johnson
(74) *Attorney, Agent, or Firm* — Oblon, McClelland, Maier & Neustadt, L.L.P.

(57) ABSTRACT

The invention relates to a method for producing hydridosilanes from halosilanes by a) reacting i) at least one halosilane of the generic formula $Si_nX_{2n+2}$ (with $n \geq 3$ and X=F, Cl, Br and/or I) with ii) at least one catalyst of the generic formula $NRR'_aR''_bY_c$ with a=0 or 1, b=0 or 1, and c=0 or 1, and formula (I), wherein aa) R, R' and/or R" are $-C_1-C_{12}$ alkyl, $-C_1-C_{12}$ aryl, $-C_1-C_{12}$ aralkyl, $-C_1-C_{12}$ aminoalkyl, $-C_1-C_{12}$ aminoaryl, $-C_1-C_{12}$ aminoaralkyl, and/or two or three groups R, R' and R" (if c=0) together form a cyclic or bicyclic, heteroaliphatic or heteroaromatic system including N, with the proviso that at least one group R, R' or R" is unequal $-CH_3$ and/or wherein bb) R and R' and/or R"' (if c=1) are $-C_1-C_{12}$ alkylene, $-C_1-C_{12}$ arylene, $-C_1-C_{12}$ aralkylene, $-C_1-C_{12}$ heteroalkylene, $-C_1-C_{12}$ heteroarylene, $-C_1-C_{12}$ heteroaralkylene and/or $-N=$, or cc) (if a=b=c=0) R=$=$C-R''' (with R'''=$-C_1-C_{10}$ alkyl, $-C_1-C_{10}$ aryl and/or $-C_1-C_{10}$ aralkyl), while forming a mixture comprising at least one halosilane of the generic formula $Si_mX_{2m+2}$ (with m>n and X=F, Cl, Br and/or I) and $SiX_4$ (with X=F, Cl, Br and/or I), and b) hydrogenating the at least one halosilane of the generic formula $Si_mH_{2m+2}$ while forming a hydridosilane of the generic formula $Si_mH_{2m+2}$. The invention also relates to the hydridosilanes producible according to said method and to their use.

13 Claims, 2 Drawing Sheets

(56) References Cited

U.S. PATENT DOCUMENTS

| | | |
|---|---|---|
| 2011/0268642 A1 | 11/2011 | Brausch et al. |
| 2012/0042951 A1 | 2/2012 | Stuetzel et al. |
| 2012/0177557 A1 | 7/2012 | Rauleder et al. |
| 2012/0183464 A1 | 7/2012 | Mueh et al. |
| 2012/0195804 A1 | 8/2012 | Lang et al. |
| 2013/0043893 A1 | 2/2013 | Mueh et al. |
| 2013/0168824 A1 | 7/2013 | Wieber et al. |

OTHER PUBLICATIONS

U.S. Appl. No. 13/824,641, filed Mar. 18, 2013, Wieber, et al.
U.S. Appl. No. 13/991,261, filed Jun. 3, 2013, Stenner, et al.
U.S. Appl. No. 13/885,316, filed May 14, 2013, Stenner, et al.
U.S. Appl. No. 13/991,986, filed Jun. 6, 2013, Brausch, et al.
U.S. Appl. No. 13/498,206, filed Mar. 26, 2012, Brausch, et al.
U.S. Appl. No. 13/574,376, Jul. 20, 2012, Wieber, et al.
U.S. Appl. No. 14/111,643, filed Oct. 14, 2013, Mueh, et al.
U.S. Appl. No. 13/985,477, filed Aug. 14, 2013, Mueh, et al.
U.S. Appl. No. 14/232,128, filed Jan. 10, 2014, Lang, et al.
Kaczmarczyk, A., et al., "The Preparation and Some Properties of a New Pentasilicon Dodecachloride, $Si_5Cl_{12}$," Journal of Inorganic and Nuclear Chemistry, vol. 26, pp. 421-425, (1964).
Chung, K.H., et al., "Ultrahigh growth rate of epitaxial silicon by chemical vapor deposition at low temperature with neopentasilane," Applied Physics Letters, vol. 92, pp. 113506-1-113506-3, (Mar. 18, 2008).
International Search Report Issued Apr. 28, 2011 in PCT/EP10/67016 Filed Nov. 8, 2010.
U.S. Appl. No. 13/884,473, filed May 9, 2013, Mueh, et al.
U.S. Appl. No. 13/884,326, filed May 9, 2013, Mueh, et al.
U.S. Appl. No. 13/510,373, filed May 17, 2012, Wieber, et al.
U.S. Appl. No. 13/503,668, filed Apr. 24, 2012, Stuetzel, et al.

METHOD FOR PRODUCING HYDRIDOSILANES

Hydridosilanes and mixtures thereof are described in the literature as possible reactants for the generation of silicon layers. Hydridosilanes are understood to mean compounds which contain essentially only silicon and hydrogen atoms. Hydridosilanes may be gaseous, liquid or solid and are—in the case of solids—essentially soluble in solvents such as toluene or cyclohexane, or in liquid silanes such as cyclopentasilane. Examples include monosilane, disilane, trisilane, cyclopentasilane and neopentasilane. Hydridosilanes having at least three or four silicon atoms may have a linear, branched or (optionally bi-/poly-)cyclic structure with Si—H bonds, and can be described by the particular generic formulae $Si_nH_{2n+2}$ (linear or branched; where $n \geq 2$), $Si_nH_{2n}$, (cyclic; where $n \geq 3$) or $Si_nH_{2(n-i)}$ (bi- or polycyclic; $n \geq 4$; i={number of cycles}−1).

Many processes for preparing hydridosilanes are based on a dehydropolymerization reaction of lower hydridosilanes, especially $SiH_4$, to higher silanes with formal $H_2$ elimination. The dehydropolymerization reaction can be performed 1) thermally (U.S. Pat. No. 6,027,705 A in the case that no catalyst is used) and/or 2) by using catalysts such as a) elemental transition metals (heterogeneous catalysis; U.S. Pat. No. 6,027,705 A in the case that platinum group metals, i.e. Ru, Rh, Pd, Os, Ir, Pt, are used; U.S. Pat. No. 5,700,400 A for metals of groups 3B-7B and 8—i.e. the transition metals/lanthanides except the Cu and Zn groups), b) nonmetal oxides (heterogeneous catalysis; U.S. Pat. No. 6,027,705 A in the case that $Al_2O_3$ or $SiO_2$ is used), c) hydridic cyclopentadienyl complexes of scandium, yttrium or rare earths (homogeneous catalysis; U.S. Pat. No. 4,965,386 A, U.S. Pat. No. 5,252,766 A), d) transition metal complexes (homogeneous catalysis; U.S. Pat. No. 5,700,400 A for complexes of metals of groups 3B-7B and 8—i.e. the transition metals/lanthanides except the Cu and Zn groups; JP 02-184513 A) or e) particular transition metals immobilized on a support (heterogeneous catalysis; U.S. Pat. No. 6,027,705 A in the case that platinum group metals on a support, for example $SiO_2$, are used, U.S. Pat. No. 5,700,400 A for ruthenium, rhodium, palladium or platinum immobilized on carbon, $SiO_2$ or $Al_2O_3$) or transition metal complexes (heterogeneous catalysis, U.S. Pat. No. 6,027,705 A in the case that platinum group metal complexes on a support, for example $SiO_2$, are used). However, all these processes have the disadvantage that the lower hydridosilanes used themselves first have to be prepared in a complicated manner. A further disadvantage of these processes is that they require a high level of apparatus complexity owing to the self-ignitability of the reactants. Finally, it has not been possible to date to achieve sufficiently high yields with these processes. Furthermore, complex purification is required.

Another process for preparing hydridosilanes, in which dihalosilanes are converted by an electrochemical route, optionally together with trihalosilanes and/or tetrahalosilanes, is described, for example, by EP 0 673 960 A1. This process too, however, has the disadvantage that, owing to the electrochemical reaction regime, it requires a high level of apparatus complexity and additionally high energy densities. Finally, the particular di- or trihalosilanes first have to be prepared in a complex manner beforehand here too.

Alternatively, it is also possible to prepare higher hydridosilanes by dehalogenation and polycondensation of halosilanes with alkali metals (GB 2 077 710 A). However, this process does not lead to sufficiently high yields either. Moreover, this process is not very selective.

A. Kaczmarczyk et al., J. Inorg. Nucl. Chem., 1964, Vol. 26, 421-425 and G. Urry, J. Inorg. Nucl. Chem., 1964, Vol. 26, 409-414 teach the catalytic formation of higher chlorosilanes from lower chlorosilanes, especially the formation of pentasilicon dodecachloride (the chlorine analogue of neopentasilane, $Si(SiH_3)_4$). For instance, A. Kaczmarczyk et al., J. Inorg. Nucl. Chem., 1964, Vol. 26, 421-425 teaches the synthesis of pentasilicon dodecachloride from hexachlorodisilane to form tetrachlorosilane. It is additionally stated there that an appropriate starting amount of octachlorotrisilane gives rise to pentasilicon dodecachloride and hexachlorodisilane.

The catalyst used there is trimethylamine. G. Urry, J. Inorg. Nucl. Chem., 1964, Vol. 26, 409-414 teaches the trimethylamine-catalysed synthesis of pentasilicon dodecachloride from hexachlorodisilane to form tetrachlorosilane, or from octachlorotrisilane to form hexachlorodisilane. The hydrogenation of the products to hydridosilanes is not described therein. Moreover, these processes do not achieve satisfactory yields of higher perchlorosilanes. Furthermore, it is disadvantageous in the synthesis variant using octachlorotrisilane that the hexachlorodisilane by-product which forms, in contrast to the tetrachlorosilane which forms in the process variant based on hexachlorodisilane, is not volatile at room temperature and standard pressure, and is therefore not drawn off but has to be distilled off in a complex manner.

WO 2008/051328 A1 teaches obtaining neopentasilane-containing compositions by reacting a hexahalodisilane of the formula $X_3SiSiX_3$ with a tertiary amine catalyst to form a first mixture comprising tetrakis(trihalosilyl)silane (Si$(SiX_3)_4$) and tetrahalosilane. The two main constituents, tetrakis(trihalosilyl)silane and tetrahalosilane, can be separated from one another. The tetrakis(trihalosilyl)silane obtained can be converted by hydrogenation with diisobutylaluminium hydride to neopentasilane ($Si(SiH_3)_4$). This process too, though, still does not lead to satisfactory yields owing to the reaction equation (4 $Si_2Cl_6 \rightarrow Si_5Cl_{12} + 3\ SiCl_4$).

It is thus an object of the present invention to avoid the described disadvantages of the prior art. More particularly, it is an object of the present invention to provide a process with which hydridosilanes, especially neopentasilane, can be prepared from halosilanes more rapidly and in a higher yield, without formation of by-products which are difficult to remove.

This object is achieved in the present document by the process according to the invention for preparing hydridosilanes from halosilanes, in which a) i) at least one halosilane of the generic formula $Si_nX_{2n+2}$ (where $n \geq 3$ and X=F, Cl, Br and/or I) and
ii) at least one catalyst of the generic formula $NRR'_aR''_bY_c$ where a=0 or 1, b=0 or 1, and c=0 or 1, and

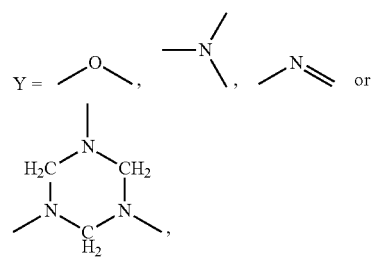

where
aa) R, R' and/or R" are each —$C_1$-$C_{12}$-alkyl, —$C_1$-$C_{12}$-aryl, -$C_1$-$C_{12}$-aralkyl, —$C_1$-$C_{12}$-aminoalkyl, —$C_1$-$C_{12}$-aminoaryl, —$C_1$-$C_{12}$-aminoaralkyl, especially preferably —Ph, —PhCH$_3$, —PhC$_2$H$_5$, —PhC$_3$H$_7$, —CH$_2$(C$_6$H$_4$)CH$_3$, —CH$_2$(C$_6$H$_4$) C$_2$H$_5$, —C$_2$H$_4$(C$_6$H$_4$)C$_2$H$_5$, —C$_2$H$_4$(C$_6$H$_4$) C$_3$H$_7$, —C$_3$H$_6$(C$_6$H$_4$)-C$_3$H$_7$, —C$_6$H$_2$(CH$_3$)$_3$, —C$_6$H$_3$(CH$_3$)$_2$, —C$_8$H$_7$, —C$_8$H$_6$CH$_3$, —PhNR'''R'''', —PhCH$_2$NR'''R'''', —PhC$_2$H$_4$NR'''R'''', —PhC$_3$H$_6$NR'''R'''', —CH$_2$ (C$_6$H$_4$)CH$_2$NR'''R'''', —CH$_2$(C$_6$H$_4$)C$_2$H$_4$-NR'''R'''', —C$_2$H$_4$(C$_6$H$_4$)C$_2$H$_4$NR'''R'''', —C$_2$H$_4$(C$_6$H$_4$)C$_3$H$_6$NR'''R'''', —C$_3$H$_6$(C$_6$H$_4$) C$_3$H$_6$NR'''R'''', —CH$_2$NR'''R'''', —C$_2$H$_4$NR'''R'''', —C$_3$H$_6$NR'''R'''', —C$_4$H$_8$NR'''R'''', —C$_5$H$_{10}$NR'''R'''', —C$_6$H$_{12}$NR'''R'''', —C$_7$H$_{14}$NR'''R'''', —C$_8$H$_{16}$NR'''R'''', —C$_9$H$_{18}$NR'''R'''' and/or —C$_{10}$H$_{20}$NR'''R'''' (where R''' and R''''=—C$_1$-C$_{10}$-alkyl, —C$_1$-$C_{10}$-aryl and/or —C$_1$-$C_{10}$-aralkyl),
and/or
two or three R, R' and R" radicals in the case that c=0 together form a cyclic or bicyclic, heteroaliphatic or heteroaromatic system including N,
the cyclic or bicyclic, heteroaliphatic or heteroaromatic system especially preferably being a pyrrolidine, pyrrole, piperidine, pyridine, hexamethyleneimine, azatropylidene or a quinoline ring system,
with the proviso that at least one R, R' or R" radical is not —CH$_3$ and/or
bb) —R and R' and/or R" (in the case that c=1) are each —$C_1$-$C_{12}$-alkylene, —$C_1$-$C_{12}$-arylene, —$C_1$-$C_{12}$-aralkylene, —$C_1$-$C_{12}$-heteroalkylene, —$C_1$-$C_{12}$-heteroarylene, —$C_1$-$C_{12}$-heteroaralkylene and/or —N=,
especially preferably —CH$_2$-, —C$_2$H$_4$—, —C$_3$H$_6$—, —C$_5$H$_{10}$—, —C$_6$H$_{12}$—, —C$_7$H$_{14}$—, —C$_8$H$_{16}$—, —C$_9$H$_{18}$—, —C$_{10}$C$_{20}$—, —Ph—, —PhCH$_2$—, —PhC$_2$H$_4$—, —PhC$_3$H$_6$—, —CH$_2$(C$_6$H$_4$) CH$_2$-, —CH$_2$(C$_6$H$_4$)C$_2$H$_4$—, —C$_2$H$_4$(C$_6$H$_4$) C$_2$H$_4$—, —C$_2$H$_4$(C$_6$H$_4$)C$_3$H$_6$-, —C$_3$H$_6$(C$_6$H$_4$) C$_3$H$_6$—, —C$_6$H(CH$_3$)$_3$—, —C$_6$H$_2$(CH$_3$)$_2$—, —CH=, —CH=CH—, —N=, —N=CH— and/or —CH=N—,
or
cc) (in the case that a=b=c=0) R=≡C—R''' (where R'''=—$C_1$-$C_{10}$-alkyl, —$C_1$-$C_{10}$-aryl and/or —$C_1$-$C_{10}$-aralkyl),
are converted to form a mixture comprising at least one halosilane of the generic formula $Si_mX_{2m+2}$ (where m>n and X=F, Cl, Br and/or I) and $SiX_4$ (where X=F, Cl, Br and/or I),
and
b) the at least one halosilane of the generic formula $Si_mX_{2m+2}$ is hydrogenated to form a hydridosilane of the generic formula $Si_mH_{2m+2}$.

This process not only achieves the objects which arise with respect to the prior art, but additionally also leads to purer hydridosilanes with better space-time yield.

Figure 1:
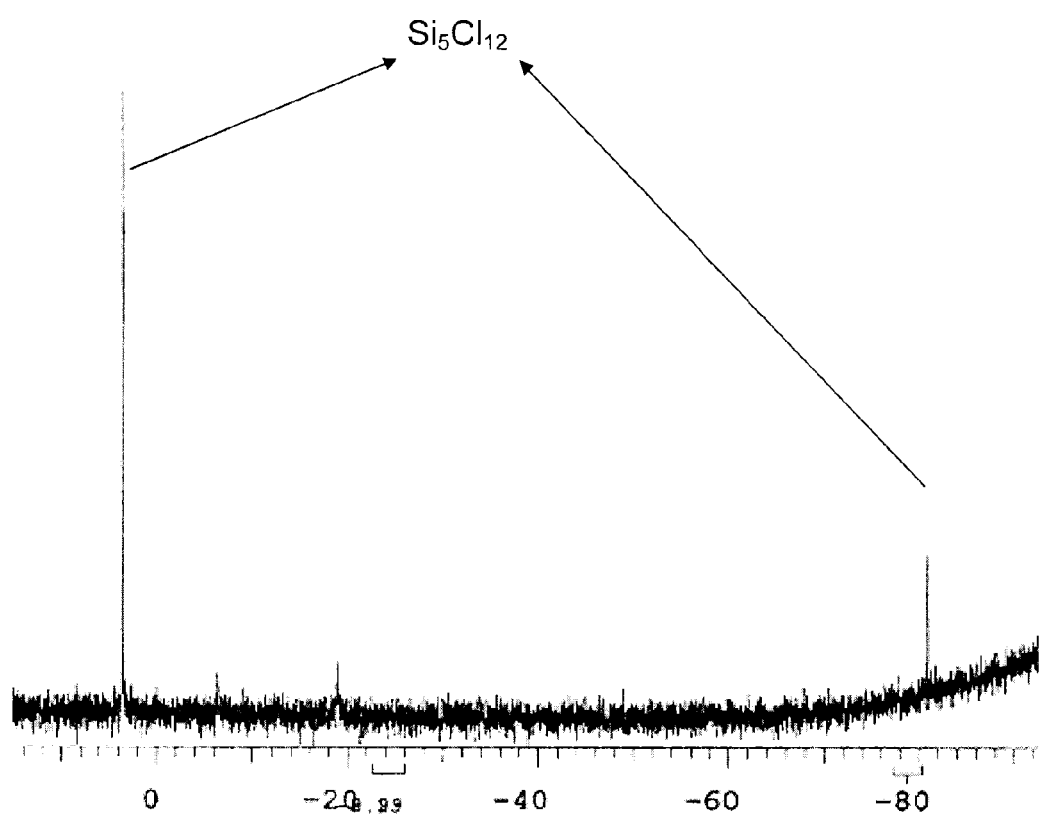
FIG. 1 shows a $^{29}$Si NMR spectrum of a reaction product from higher halosilane synthesis.

The halosilane used in the process according to the invention is a compound which consists essentially only of silicon atoms and halogen atoms (halogen=fluorine, chlorine, bromine, iodine) and which has at least three silicon atoms. Halosilanes of the generic formula $Si_nX_{2n+2}$ having at least three or four silicon atoms may have a linear or branched structure.

Particularly efficiently usable for the process according to the invention are linear halosilanes.

The at least one halosilane of the generic formula $Si_nX_{2n+2}$ is preferably a compound selected from the group of the octahalotrisilanes or of the decahalotetrasilanes, i.e. the compounds of the generic formula $Si_3X_8$ or $Si_4X_{10}$ where X=F, Cl, Br and/or I.

Very particular preference is given to octahalotrisilanes. Among these compounds, particular preference is given in turn to octafluorotrisilane, octachlorotrisilane, octabromotrisilane and octaiodotrisilane, i.e. the compounds of the generic formula $Si_3X_8$ where X=F, Cl, Br or I. Very particular preference is given to using octachlorotrisilane for the process according to the invention. The use of octachlorotrisilane has the advantage in the process according to the invention that neopentasilane can be prepared as the primary process product (in addition to $SiX_4$) in significantly higher yields and in significantly higher purity than by other prior art processes.

The proportion of the at least one halosilane in the reaction mixture used in the process is preferably at least 60%, preferably at least 80%, by weight, based on the total mass of the reaction mixture. The reaction mixture most preferably comprises only the at least one catalyst and the halosilane(s).

In the process according to the invention, one halosilane or a plurality of halosilanes may be used. Preference is given to using only one halosilane. When a plurality of halosilanes is used, at least one halosilane is preferably present in the form of octahalotrisilane in a proportion of at least 20%, preferably at least 80%, by weight, based on the mixture of halosilanes.

The catalyst usable in the process according to the invention is a catalyst of the generic formula

where a=0 or 1, b=0 or 1, and c=0 or 1, and

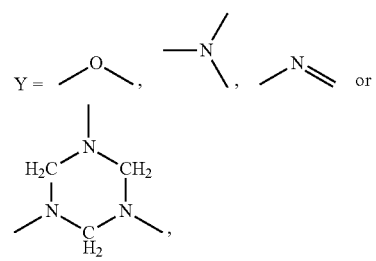

where R, R' and R" may each independently be different mono- or divalent radicals which are substituents of the nitrogen atom N, or may form an (optionally bi- or tri-)cyclic structure with the nitrogen atom - optionally with incorporation of a Y group if present.

In the case that c=0 and a and b=1, the generic formula of the catalyst describes a preferred group of catalysts which may be tertiary (optionally cyclic, bicyclic or tricyclic) amines or nitrogen-containing heteroaromatics.

In the case that a=b=1 and c=0, the catalyst in this case is more preferably a tertiary amine, i.e. a catalyst of the generic formula

NRR'R"

in which R, R' and R" are each —Ph, —PhCH₃, —PhC₂H₅, —PhC₃H₇, —CH₂(C₆H₄)CH₃, —CH₂(C₆H₄)C₂H₅, —C₂H₄(C₆H₄)C₂H₅, —C₂H₄(C₆H₄)C₃H₇, —C₃H₆(C₆H₄)-C₃H₇, —C₆H₂(CH₃)₃, —C₆H₃(CH₃)₂, —C₈H₇, —C₈H₆CH₃, —PhNR'''R'''', —PhCH₂NR'''R'''', —PhC₂H₄NR'''R'''', —PhC₃H₆NR'''R'''', —CH₂(C₆H₄)CH₂NR'''R'''', —CH₂H₄(C₆H₄)—C₂H₄NR'''R'''', —C₂H₄(C₆H₄)-C₃H₆(C₆H₄)C₃H₆NR'''R'''', —CH₂NR'''R'''', —C₂H₄NR'''R'''', —C₃H₆NR'''R'''', —C₄H₈NR'''R'''', —CH₅H₁₀NR'''R'''', —C₆H₁₂NR'''R'''', —C₇H₁₄NR'''R'''', —C₈H₁₆NR'''R'''', —C₉H₁₈NR'''R'''' and/or —C₁₀H₂₀NR'''R''''(where R''' and R''''=—C₁-C₁₀-aryl and/or —C₁-C₁₀-aryl and/or —C₁-C₁₀-aralkyl), with the proviso that at least one R' or R" radical is not —CH₃.

In the case that c=0 and a=1 and b=0 or 1, two or three R, R' and R" radicals may preferably together form a cyclic or bicyclic, heteroaliphatic or heteroaromatic system including N. The resulting catalysts are preferably cyclic or bicyclic, heteroaliphatic or heteroaromatic ring systems, preferably pyrrolidine, pyrrole, piperidine, pyridine, hexa-methylene-imine, azatropylidene or quinoline.

Preferably (in the case that a=b=c=0), R may also be ≡C—R''' (where R'''=—C₁-C₁₀-aryl, —C₁-C₁₀-aryl and/or —C₁-C₁₀-aralkyl). Corresponding catalysts are alkyl nitriles.

In the case that c=1, the generic formula NRR'$_a$R"$_b$Y$_c$ describes different catalysts having at least one further heteroatom and having cyclic or bi-(optionally poly-)cyclic structure.

Preferred monocyclic structures, for example triazoles, oxazines or piperazines, result in the case that

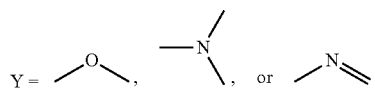

and two or three corresponding R, R' and R" radicals are selected from the group consisting of —C₁-C₁₂-alkylene, —C₁-C₁₂-arylene, —C₁-C₁₂-aralkylene, —C₁-C₁₂-heteroalkylene, —C₁-C₁₂-heteroarylene and —C₁-C₁₂-heteroaralkylene radicals and/or —N═(preferably —CH₂—, —C₂H₄—, —C₃H₆—, —C₄H₈—, —C₅H₁₀—, —C₆H₁₂—, —C₇H₁₄—, —C₈H₁₆—, —C₉H₁₈—, —C₁₀H₂₀—, —Ph—, —PhCH₂—, —PhC₂H₄—, —PhC₃H₆—, —CH₂(C₆H₄)CH₂—, —CH₂(C₆H₄)C₂H₄—, —C₂H₄(C₆H₄)C₂H₄—, —C₂H₄(C₆H₄)C₃H₆—, —C₃H₆(C₆H₄)C₃H₆—, —C₆H(CH₃)₃—, —C₆H₂(CH₃)₂—, —CH═, —CH═CH—, —N═, —N═CH— and/or —CH═N—). Any R, R' or R" radical not involved in the ring formation is then selected from the group consisting of —C₁-C₁₂-alkyl, —C₁-C₁₂-aryl, —C₁-C₁₂-aralkyl, —C₁-C₁₂-aminoalkyl, —C₁-C₁₂-aminoaryl, —C₁-C₁₂-aminoaralkyl, preferably —Ph, —PhCH₃, —PhC₂H₅, —PhC₃H₇, —CH₂(C₆H₄)CH₃, —CH₂(C₆H₄)C₂H₅, —C₂H₄(C₆H₄)C₂H₅, —C₂H₄(C₆H₄)C₃H₇, —C₃H₆(C₆H₄)—C₃H₇, —C₆H₂(CH₃)₃, —C₆H₃(CH₃)₂, —C₈H₇, —C₆CH₃, —PhNR'''R'''', —PhCH₂NR'''R'''', —PhC₂H₄NR'''R'''', —PhC₃H₆NR'''R'''', —CH₂(C₆H₄)CH₂NR'''R'''', —CH₂(C₆H₄)C₂H₄NR'''R'''', —C₂H₄(C₆H₄)C₂H₄NR'''R'''', —C₂H₄(C₆H₄)C₃H₆NR'''R'''', —C₃H₆(C₆H₄)C₃H₆NR'''R'''', —CH₂NR'''R'''', —C₂H₄ NR'''R'''', —C₃H₆NR'''R'''', —C₄H₈NR'''R'''', —C₅H₁₀NR'''R'''', —C₆H₁₂NR'''R'''', —C₇H₁₄NR'''R'''', —C₈H₁₆NR'''R'''', —C₉H₁₈NR'''R'''' and/or —C₁₀H₂₀NR'''R'''' (where R''' and R''''=—C₁-C₁₀-alkyl, —C₁-C₁₀-aryl and/or —C₁-C₁₀-aralkyl)

The catalyst of the generic formula NRR'$_a$R'$_b$Y$_c$ where c=1 is most preferably a bi- or polycyclic amine compound. Bi- or polycyclic amine compounds are the result in the case that

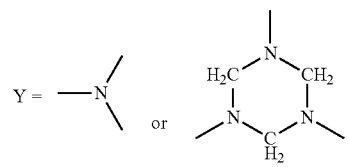

and a corresponding selection of the R, R' and R" radicals is made from the group consisting of —C₁-C₁₂-alkylene, —C₁-C₁₂-arylene, —C₁-C₁₂-aralkylene, —C₁-C₁₂-heteroalkylene, —C₁-C₁₂-heteroarylene and —C₁-C₁₂-heteroaralkylene radicals and/or —N═. The R, R' and R" radicals are further preferably selected from the group consisting of —CH₂—, —C₂H₄—, —C₃H₆—, —C₄H₈—, —C₅H₁₀—, —C₆H₁₂—, —C₇H₁₄—, —C₈H₁₆—, —C₉H₁₈—, —C₁₀H₂₀—, —Ph—, —PhCH₂—, —PhC₂H₄—, —PhC₃H₆—, —CH₂(C₆H₄)CH₂—, —CH₂(C₆H₄)C₂H₄—, —C₂H₄(C₆H₄)C₂H₄—, —C₂H₄(C₆H₄)C₃H₆—, —C₃H₆(C₆H₄)C₃H₆—, —C₆H(CH₃)₃—, —C₆H₂(CH₃)₂—, —CH═, —CH═CH—, —N═, —N═CH— and/or —CH═N—. Very particularly preferred catalysts are azabicycloalkanes and piperazines, especially diazabicyclooctane and N,N-1,4-dimethylpiperazine.

The best results can be achieved when the catalysts used in the process according to the invention are selected from the group of compounds consisting of cyclic, bicyclic and polycyclic amines with or without further heteroatoms.

Even further preferably, the catalyst used may be diazabicyclooctane, pyridine and N,N-1,4-dimethylpiperazine. These catalysts are particularly suitable for catalysing the conversion of octahalotrisilanes to the corresponding tetrakis(trihalosilyl)silanes (Si(SiX₃)₄).

The present invention thus likewise provides a process for preparing neopentasilane, in which
a) i) at least one octahalotrisilane of the generic formula Si₃X₃ where X═F, Cl, Br and/or I is converted with
ii) at least one catalyst selected from the group consisting of diazabicyclooctane, pyridine and N,N-1,4-dimethylpiperazine
to form a mixture comprising at least one halosilane of the generic formula Si₅X₁₂ (where X═F, Cl, Br and/or I) and SiX₄ (where X═F, Cl, Br and/or I), and
b) the at least one halosilane of the generic formula Si₅X₁₂ is hydrogenated to form neopentasilane.

The proportion of the at least one catalyst, based on the amount of chlorosilane used, in the process according to the invention for preparing hydridosilanes, especially neopentasilane, is preferably in the range from 0.001 to 1% by weight.

The catalyst can be used in the form of a pure substance or in the form of a slurry in a solvent, for example diethyl ether, preferably in proportions of the catalyst of 1-25% by weight based on the total mass of the slurry.

The reaction can be effected in the presence or absence of a solvent. The process according to the invention is preferably performed without solvents. When it is, though, performed in the presence of a solvent, preferred solvents used may be solvents selected from the group consisting of linear, branched and cyclic, saturated, unsaturated and aromatic hydrocarbons having one to 12 carbon atoms (optionally partially or fully halogenated), ethers, ketones and esters. Particular preference is given to n-pentane, n-hexane, n-heptane, n-octane, n-decane, dodecane, cyclohexane, cyclooctane, cyclodecane, dicyclopentane, benzene, toluene, m-xylene, p-xylene, mesitylene, tetrahydronaphthalene, decahydronaphthalene, diethyl ether, dipropyl ether, ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, tetrahydrofuran, acetone, p-dioxane, acetonitrile, dimethylformamide, dimethyl sulfoxide, dichloromethane and chloroform. Solvents usable particularly efficiently are the hydrocarbons n-pentane, n-hexane, n-hexane, n-octane, n-decane, dodecane, cyclohexane, cyclooctane, cyclodecane, benzene, toluene, m-xylene, p-xylene, mesitylene. The solvent may make up 0.01 to 90% by weight of the total mass.

The catalyst-supported conversion of the halosilane of the generic formula $Si_nX_{2n+2}$ is effected preferably at temperatures of −78 to 300° C. and pressures of 1 mbar to 5 bar. Particular preference is given to effecting the catalyst-supported conversion of the halosilane at 10-50° C. and 900 to 1100 mbar.

After the formation of the mixture containing at least one halosilane of the generic formula $Si_mX_{2m+2}$ (where m>n and X=F, Cl, Br and/or I) and $SiX_4$, this mixture can in principle be used for the subsequent hydrogenation without further purification.

Preference is given, however, to removing the tetrahalosilane formed from the halosilane of the generic formula $Si_mX_{2m+2}$ formed before the hydrogenation. This is further preferably effected by means of distillative removal or drawing off $SiX_4$ at temperatures of −30 to +100° C. and pressures of 0.01 to 1100 mbar, preferably at temperatures of +20 to +30° C. and pressures of 0.02 to 0.2 mbar.

The at least one halosilane of the generic formula $Si_mX_{2m+2}$ is hydrogenated to form a hydridosilane of the generic formula $Si_mH_{2m+2}$. This is preferably effected using at least one hydrogenating agent selected from the group of the metal hydrides of a metal of main groups 1 to 3 (especially alkali metal or alkaline earth metal hydrides) or the group of hydridic compounds consisting of $LiAlH_4$, $NaBH_4$, $iBu_2AlH$. The hydrogenating agent is more preferably $iBu_2AlH$.

Hydridosilanes preparable by the process according to the invention are also understood to mean compounds which contain essentially only silicon and hydrogen atoms. These hydridosilanes may be gaseous, liquid or solid and are—in the case of solids—essentially soluble in solvents such as toluene or cyclohexane, or in liquid silanes such as cyclopentasilane. Examples include disilane, trisilane, cyclopentasilane and neopentasilane. These hydridosilanes too may have a linear or branched structure with Si—H bonds. The process according to the invention is particularly suitable for preparing branched hydridosilanes. More particularly, it is especially suitable given selection of suitable reactants for preparation of neopentasilane.

In the hydrogenation, the hydrogenating agent is present preferably in a 2- to 30-fold, preferably 10- to 15-fold, molar excess, based on the halosilanes present.

The hydrogenation can also be effected in the presence or absence of a solvent. Preference is given to performing the hydrogenation without solvent. When, though, hydrogenation is effected in the presence of a solvent, solvents useable with preference may be selected from the group consisting of linear, branched and cyclic, saturated, unsaturated and aromatic hydrocarbons having one to 12 carbon atoms and ethers. Particular preference is given to n-pentane, n-hexane, n-heptane, n-octane, n-decane, dodecane, cyclohexane, cyclooctane, cyclodecane, dicyclopentane, benzene, toluene, m-xylene, p-xylene, mesitylene, tetrahydronaphthalene, decahydronaphthalene, diethyl ether, dipropyl ether, ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, tetrahydrofuran, p-dioxane, acetonitrile. Particularly efficiently useable solvents are the hydrocarbons n-pentane, n-hexane, n-hexane, n-octane, n-decane, dodecane, cyclohexane, cyclooctane, cyclodecane, benzene, toluene, m-xylene, p-xylene, mesitylene. The solvent may make up 0.01 to 90% by weight of the total mass.

The halosilane of the generic formula $Si_mX_{2m+2}$ is preferably hydrogenated at temperatures of −78 to 300° C. and pressures of 500 mbar to 5 bar. Particular preference is given to effecting the hydrogenation at −10-30° C. and 900 to 1100 mbar.

The invention likewise provides the hydridosilanes preparable by the process.

The invention further provides for the use of the hydridosilanes preparable by the process according to the invention for producing electronic or optoelectric component layers, especially for photovoltaic applications or in transistors.

The invention likewise provides for the use of the hydridosilanes preparable by the process according to the invention for producing silicon-containing layers, preferably elemental silicon layers.

The examples which follow are intended to further illustrate the subject-matter of the invention, without themselves having a restrictive effect.

EXAMPLES

1. Inventive Example a) Synthesis of Higher Halosilanes and Removal
i) Conversion of $Si_3Cl_8$ to $Si_5Cl_{12}$
aa) Catalyst Variant I 50.8 g (0.14 mol) of octachlorotrisilane were admixed at room temperature, while stirring, 40.0 mg (3.6×10⁻⁴ mol; 0.25 mol %) of 1,4-diazabicyclo[2.2.2]octane in 0.5 ml of diethyl ether, and then the reaction mixture solidified within 2 hours as a result of the white solid formed. After removal of the volatile constituents ($SiCl_4$) at 40° C. under reduced pressure (0.05 mbar), the $Si_5Cl_{12}$ product remains as a white crystalline solid. The main product which remains, according to $^{29}Si$ NMR spectroscopy (cf. FIG. 1), is virtually pure $Si_5Cl_{12}$. The yields indicate the following reaction equation:
2 $Si_3Cl_8 \rightarrow Si_5Cl_{12} + SiCl_4$ 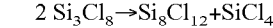

$Si_5Cl_{12}$ yield: 37.0 g $SiCl_4$ yield: 13.0 g bb) Catalyst Variant II 5.1 g (0.014 mol) of octachlorotrisilane were admixed at room temperature, while stirring, with a solution of 3.7 mg (3.3×10⁻⁵ mol; 0.25 mol%) of N,N-dimethylpiperazine in 0.04 ml of diethyl ether, and then the reaction mixture solidified within 2 hours as a result of the white solid formed. After removal of the volatile constituents at 40° C. under reduced pressure (0.05 mbar), the product remains as a white crystalline solid, which was identifiable as pure $Si_5Cl_{12}$ by means of $^{29}Si$ NMR spectroscopy.

$Si_5Cl_{12}$ yield: 3.7 g cc) Catalyst Variant III 5.1 g (0.014 mol) of octachlorotrisilane were admixed at room temperature, while stirring, with 4.4 mg ($4.0 \times 10^{-5}$ mol; 0.3 mol %) of N,N-dimethylpiperazine, and then the reaction mixture solidified within 24 hours as a result of the white solid formed. After removal of the volatile constituents at 40° C. under reduced pressure (0.05 mbar), the product remains as a white crystalline solid which was identifiable as pure $Si_5Cl_{12}$ by means of $^{29}Si$ NMR spectroscopy.

$Si_5Cl_{12}$ yield: 3.7 g dd) Catalyst Variant IV 5.1 g (0.014 mol) of octachlorotrisilane were admixed at room temperature, while stirring, with a solution of 2.8 mg ($3.5 \times 10^{-5}$ mol; 0.25 mol %) of pyridine in 0.04 ml of diethyl ether, and then the reaction mixture solidified within 12 hours as a result of the white solid formed. After removal of the volatile constituents at 40° C. under reduced pressure (0.05 mbar), the product remains as a crystalline solid which was identifiable as pure $Si_5Cl_{12}$ by means of $^{29}Si$ NMR spectroscopy.

$Si_5Cl_{12}$ yield: 3.7g ee) Catalyst Variant V 5.1 g (0.014 mol) of octachlorotrisilane were admixed at room temperature, while stirring, with 3.5 mg ($4.2 \times 10^{-5}$ mol; 0.3 mol %) of pyridine, and then the reaction mixture solidified within 12 hours as a result of the white solid formed. After removal of the volatile constituents at 40° C. under reduced pressure (0.05 mbar), the product remains as a crystalline solid which was identifiable as pure $Si_5Cl_{12}$ by means of $^{29}Si$ NMR spectroscopy. The yields indicate the following reaction equation:

$Si_5Cl_{12}$ yield: 3.7 g ii) Conversion of the Distillation Residue of $Si_3Cl_8$ to $Si_5Cl_{12}$ 50 g of a mixture of higher chlorosilanes having at least 4 silicon atoms which originates from the synthesis of octachlorotrisilane and remains after the distillative removal of octachlorotrisilane was admixed at room temperature, while stirring, with 40.0 mg ($3.6 \times 10^{-4}$ mol) of 1,4-diazabicyclo[2.2.2]octane in 0.5 nil of diethyl ether, and then the reaction mixture solidified with 12 hours as a result of the white solid formed. After removal of the volatile constituents (SiCl$_4$) at 40° C. under reduced pressure (0.05 mbar), a white crystalline solid remains.

$Si_5Cl_{12}$ yield: 44.0 g $SiCl_4$ yield: 6.0g

Conclusion: Higher chlorosilanes can also be rearranged catalytically to $Si_5Cl_{12}$. The yield even rises compared to di- or trisilane, while the product quality remains very appealing. The reaction rate is somewhat less relative to $Si_3Cl_8$.

b) Hydrogenation 38.0 g (0.067 mol) of tetrakis(trichlorosilyl)silane were admixed, while cooling with ice, with 131 g (0.92 mol) of diisobutylaluminium hydride and stirred at room temperature overnight. Subsequently, the product was isolated from the reaction mixture by recondensation under reduced pressure (0.05 mbar, room temperature) to obtain a clear, colourless liquid.

Figure 2:
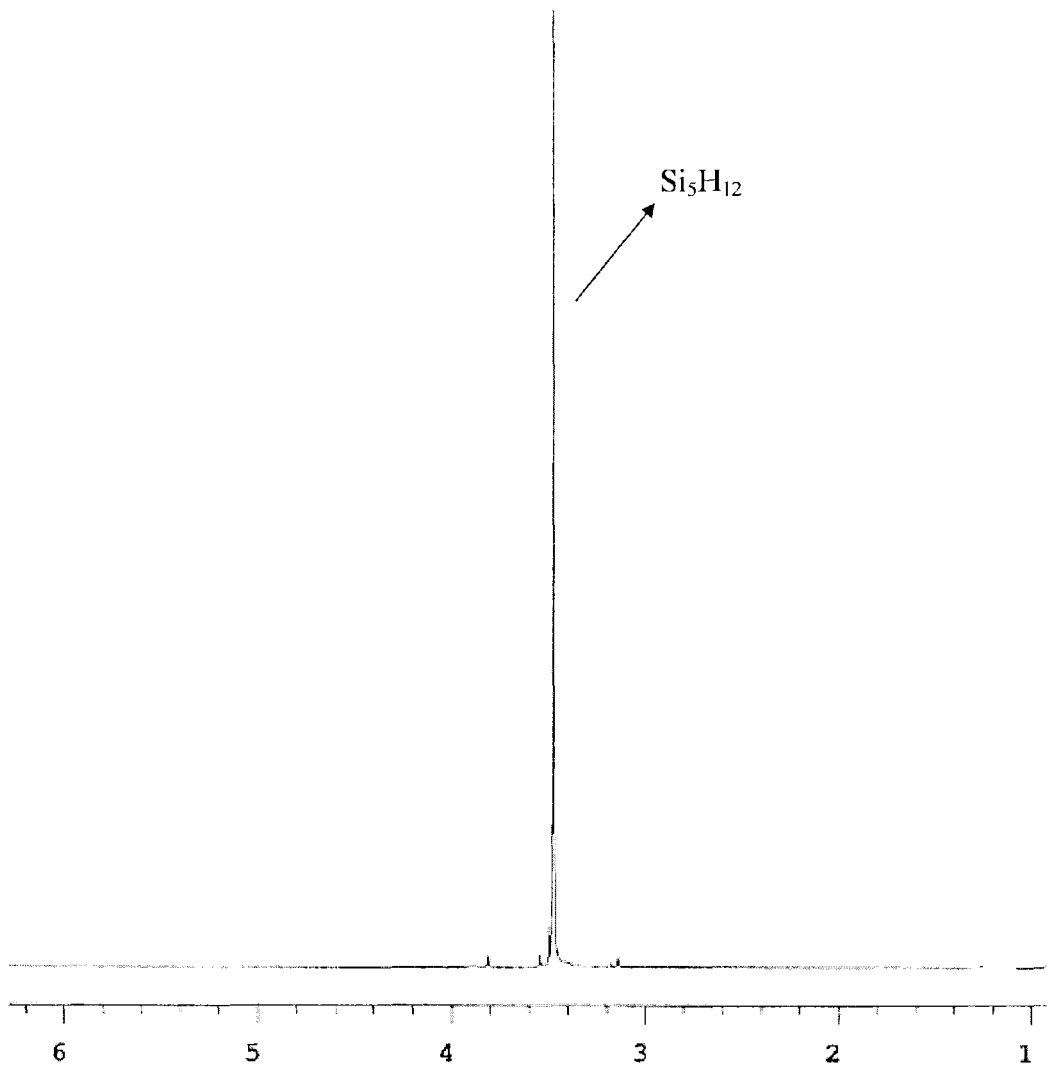
FIG. 2 shows a $^1$H-NMR spectrum for a hydrogenation product after higher halosilane synthesis.

The $^1H$ NMR (FIG. 2) shows $Si_5H_{12}$ as the main product.

Yield: 9.7 g

2. Comparative Example a) Conversion of $Si_2Cl_6$ to $Si_5Cl_{12}$ 60 g (0.22 mol) of hexachlorodisilane were admixed at room temperature, while stirring, with 60.0 mg ($5.4 \times 10^{-4}$ mol; 0.24 mol %) of 1,4-diazabicyclo[2.2.2]octane in 0.5 ml of diethyl ether, and then the reaction mixture solidified within 15 hours as a result of the white solid formed. After removal of the volatile constituents at 40° C. under reduced pressure (0.05 mbar), the product remains as a white crystalline solid. The reaction product formed, according to $^{29}Si$ NMR spectroscopy, is virtually pure $Si_5Cl_{12}$.

$Si_5Cl_{12}$ yield: 29.6 g $SiCl_4$ yield: 28.0 g

Conclusion:

$Si_3Cl_8$ and higher chlorosilanes can be rearranged catalytically to $Si_5Cl_{12}$. The yields are higher than in the case of use of $Si_2Cl_6$. The reaction rate is significantly greater relative to the use of $Si_2Cl_6$.

The invention claimed is:

1. A process for preparing a hydridosilane, the process comprising:
   (a) reacting at least one halosilane of formula $Si_nX_{2n+2}$ in the presence of at least one catalyst of formula $NRR'_aR''_bY_c$ to form a mixture comprising a halosilane of formula $Si_mX_{2m+2}$ and $SiX_4$; and
   (b) hydrogenating the halosilane of formula $Si_mX_{2m+2}$ to form a hydridosilane of formula $Si_mH_{2m+2}$,
   wherein:
   $n \geq 3$;
   $m > n$;
   X individually represents F, Cl, Br, or I;
   a=0 or 1;
   b=0 or 1;
   c=0 or 1;

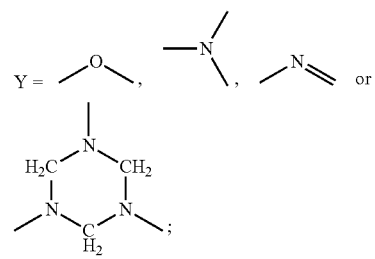

and
R, R' and R'' satisfy at least one condition selected from the group consisting of:
   (i) R, R', R'', or a combination thereof, individually represent a $C_1$-$C_{12}$-alkyl group, a $C_1$-$C_{12}$-aryl group, a $C_1$-$C_{12}$-aralkyl group, a $C_1$-$C_{12}$-aminoalkyl group, a $C_1$-$C_{12}$-aminoaryl group, or a $C_1$-$C_{12}$-aminoaralkyl group, such that at least one of R, R' and R'' is not a $CH_3$ group;
   (ii) when c=0,
      two or three of R, R' and R'' together form a cyclic or bicyclic, heteroaliphatic or heteroaromatic group comprising N, such that at least one of R, R' and R'' is not a $CH_3$ group;
   (iii) when c=1,
      R, R', R'', or a combination thereof, individually represents a $C_1$-$C_{12}$-alkylene group, a $C_1$-$C_{12}$-arylene group, a $C_1$-$C_{12}$-aralkylene group, a $C_1$-$C_{12}$-heteroalkylene group, a $C_1$-$C_{12}$-heteroarylene group, a $C_1$-$C_{12}$-heteroaralkylene group, or a —N= group; and (iv) when a=b=c=0, R represents a=C—R''' group, where R''' represents a $C_1$-$C_{10}$-alkyl group, a $C_1$-$C_{10}$-aryl group, or a $C_1$-$C_{10}$-aralkyl group.

2. The process of claim 1, wherein the halosilane of formula $Si_nX_{2n+2}$ is a linear silane.

3. The process of claim 1, wherein the halosilane of formula $Si_nX_{2n+2}$ is at least one a selected from the group consisting of a silane of formula $Si_3X_8$ and a silance of formula $Si_4X_{10}$, where X individually represents F, Cl, Br, or I.

4. The process of claim 1, wherein the catalyst is at least one selected from the group consisting of a cyclic amine, a bicyclic amine and a polycyclic amine, said amines optionally comprising an additional heteroatom.

5. The process of claim 4, wherein the catalyst is diazabicyclooctane, pyridine or N,N-1,4-dimethylpiperazine.

6. The process of claim 1, further comprising, before the hydrogenating (b), separating the halosilane of formula $Si_mX_{2m+2}$ from the $SiX_4$ by distillative removal or drawing off $SiX_4$ at temperatures of −30 to +100° C. and pressures of 0.01 to 1100 mbar.

7. The process of claim 1, wherein the hydrogenating (b) occurs by adding to the halosilane of formula $Si_mX_{2m+2}$ at least one hydrogenating agent selected from the group consisting of a metal hydride of a group 1 metal, a metal hydride of a group 2 metal, a metal hydride of a group 3 metal, $LiAlH_4$, $NaBH_4$, and $iBu_2AlH$.

8. The process of claim 7, wherein the hydrogenating agent is present in a 2- to 30-fold molar excess, based on the halosilanes present.

9. A hydridosilane obtained by the process of claim 1.

10. An electronic or optoelectronic component layer, comprising the hydridosilane of claim 9.

11. A silicon-containing layer, comprising the hydridosilane of claim 9.

12. The process of claim 7, wherein the hydrogenating agent is present in a 10- to 15-fold molar excess, based on the halosilanes present.

13. The silicon-containing layer of claim 11, comprising an elemental silicon layer.

* * * * *